(12) United States Patent
Pollard et al.

(10) Patent No.: US 11,112,036 B2
(45) Date of Patent: Sep. 7, 2021

(54) INTUMESCENT PROTECTION OF PTFE HOSES

(71) Applicant: HS Marston Aerospace Limited, Wolverhampton (GB)

(72) Inventors: Berwyn Owain Pollard, Wolverhampton (GB); Stephen Whalley, Shropshire (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 53 days.

(21) Appl. No.: 16/167,769

(22) Filed: Oct. 23, 2018

(65) Prior Publication Data
US 2019/0257450 A1   Aug. 22, 2019

(30) Foreign Application Priority Data
Feb. 21, 2018 (EP) .................................. 18275028

(51) Int. Cl.
*F16L 11/12* (2006.01)
*F16L 11/08* (2006.01)
(Continued)

(52) U.S. Cl.
CPC .......... *F16L 11/125* (2013.01); *F16L 11/085* (2013.01); *F16L 11/086* (2013.01); *B32B 1/08* (2013.01);
(Continued)

(58) Field of Classification Search
CPC ...... F16L 11/125; F16L 11/085; F16L 11/086; B32B 1/08; B32B 27/322;
(Continued)

(56) References Cited

U.S. PATENT DOCUMENTS 4,509,559 A * 4/1985 Cheetham ................ E04B 1/94
138/121
4,543,281 A 9/1985 Pedersen et al.
(Continued)

FOREIGN PATENT DOCUMENTS

| CA | 1220600 A | 4/1987 |
|---|---|---|
| EP | 3012930 A1 | 4/2016 |

(Continued)

OTHER PUBLICATIONS

Extended European Search Report for International Application No. 18275028.1 dated Aug. 30, 2018, 7 pages.
(Continued)

*Primary Examiner* — Craig M Schneider
*Assistant Examiner* — David R Deal
(74) *Attorney, Agent, or Firm* — Cantor Colburn LLP

(57) ABSTRACT

A multi-layer flexible hose is described comprising a multi-layered structure that has an inner, hollow tube comprising PTFE and an outer layer. The inner PTFE tube is provided so as to extend within the outer layer. The assembly further comprises another sleeve comprising steel braiding that is positioned between the inner PTFE tube and the outer layer. In addition to this, the hose further comprises a coating or layer of intumescent material that is provided between the steel braiding sleeve and the outer layer. A method for forming the hose is also described.

8 Claims, 2 Drawing Sheets

(51) Int. Cl.
 *B32B 1/08* (2006.01)
 *B32B 27/32* (2006.01)

(52) U.S. Cl.
 CPC ....... *B32B 27/322* (2013.01); *B32B 2262/101* (2013.01); *B32B 2307/304* (2013.01); *B32B 2307/3065* (2013.01); *B32B 2597/00* (2013.01)

(58) Field of Classification Search
 CPC ........ B32B 2262/101; B32B 2307/304; B32B 2307/3065; B32B 2597/00
 USPC .......................... 138/125, 123, 124, 137, 138
 See application file for complete search history.

(56) References Cited

U.S. PATENT DOCUMENTS

| | | | | |
|---|---|---|---|---|
| 5,421,127 | A * | 6/1995 | Stefely | A62C 2/06 52/1 |
| 6,546,963 | B2 * | 4/2003 | Nuss | F16L 9/147 138/133 |
| 6,610,399 | B1 * | 8/2003 | Crigler | E01D 19/16 428/375 |
| 8,784,962 | B2 * | 7/2014 | Weidinger | B32B 5/32 428/36.91 |
| 10,190,706 | B2 * | 1/2019 | Mentink | B32B 25/08 |
| 2010/0263761 | A1 * | 10/2010 | Niccolls | B32B 1/08 138/146 |
| 2010/0266790 | A1 * | 10/2010 | Kusinski | B32B 1/08 428/34.6 |
| 2012/0040114 | A1 | 2/2012 | Chen | |
| 2012/0186684 | A1 | 7/2012 | Giovannetti et al. | |
| 2015/0013874 | A1 | 1/2015 | Siebert et al. | |
| 2015/0260328 | A1 * | 9/2015 | Colcombet | B32B 27/322 138/125 |

FOREIGN PATENT DOCUMENTS

FR 2997471 A1 5/2014
GB 1523152 A 8/1978

OTHER PUBLICATIONS

European Official Letter for Application No. 18275028.1, dated Oct. 28, 2020, 5 pages.

* cited by examiner

INTUMESCENT PROTECTION OF PTFE HOSES

FOREIGN PRIORITY

This application claims priority to European Patent Application No. 18275028.1 filed Feb. 21, 2018, the entire contents of which is incorporated herein by reference.

TECHNICAL FIELD

The subject matter disclosed herein relates to the protection of flexible PTFE hoses. In particular, the present disclosure concerns the protection of flexible PTFE hoses that may be used in the aerospace industry for low to medium pressure applications. Other uses are, however, also envisaged.

BACKGROUND

Flexible hoses or pipe assemblies are often used throughout the aerospace industry for low to medium pressure applications. In particular, due to component installation constraints and/or weight limitations, PTFE lined steel braided hoses are often used in situations where the pipes experience high vibration levels. Most of the pipe assemblies of this type, however, must allow for high fluid flow rates in order to meet the stringent fire test requirements during certification. It has been found, however, that due to a recent industry shift from propane gas to a kerosene burner fuel, these tests have become more onerous to pass, thereby resulting in a higher minimum flow rate being required in order to achieve certification. In order to meet a test environment simulating an engine shut down, i.e. zero flow, many fuel and oil hoses have therefore required substantial increases in the thickness of both the steel braiding and/or the protective fire sleeve surrounding the hose. Unfortunately, this has both weight and size impacts that may be undesirable.

BRIEF SUMMARY

A multi-layer flexible hose is described herein comprising: an inner, hollow tube comprising PTFE and an outer layer, the PTFE tube being provided so as to extend longitudinally within the outer layer; a sleeve comprising steel braiding being positioned between the inner PTFE tube and the outer layer; the hose further comprising: a coating of intumescent material provided between the steel braiding sleeve and the outer layer.

The multi-layer flexible hose may further comprise: a silicon sleeve provided between the steel braiding sleeve and the layer or coating of intumescent material.

In some examples described herein an outer surface of the outer layer may provide the external surface of the hose.

In some examples described herein the outer layer may comprise silicon or fiberglass.

A method of making a multi-layer flexible hose is also described herein comprising: providing an inner, hollow tube comprising PTFE and providing an outer layer, the PTFE tube being provided so as to extend within the outer layer; providing a sleeve comprising steel braiding between the inner PTFE tube and the outer layer; the method further comprising: providing a coating or layer of intumescent material between the steel braiding sleeve and the outer layer.

In some examples described herein the method may further comprise: providing a silicon sleeve between the steel braiding sleeve and the layer or coating of intumescent material.

In some examples described herein the outer layer may comprise silicon or fiberglass.

BRIEF DESCRIPTION OF THE DRAWINGS

The subject matter is particularly pointed out and distinctly claimed in the claims at the conclusion of the specification. The foregoing and other features and advantages of the embodiments are apparent from the following detailed description taken in conjunction with the accompanying drawings in which like elements are numbered alike in the FIGURES:

DETAILED DESCRIPTION

Figure 1:
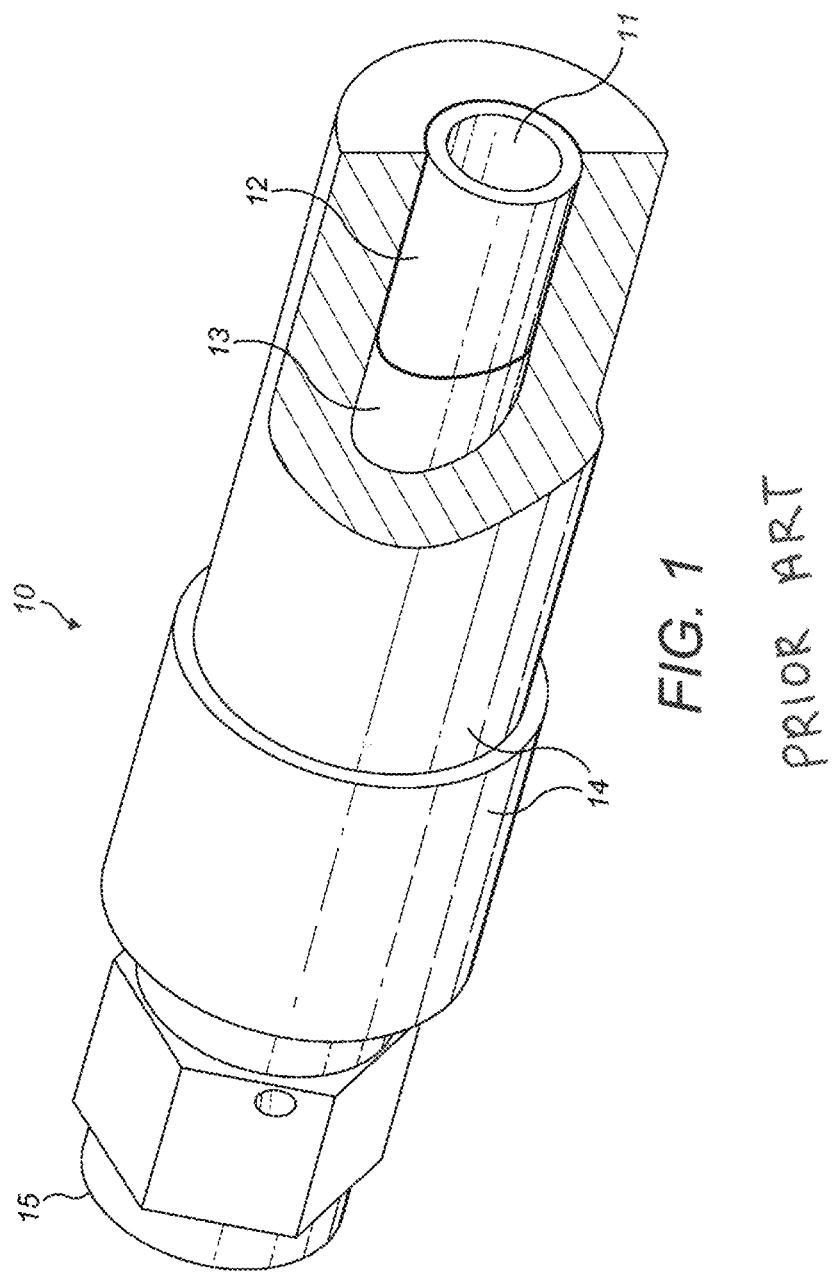
FIG. 1 depicts a known type of standard PTFE lined steel braided hose 10.

FIG. 1 depicts a known type of standard PTFE lined steel braided hose 10. The hose 10 comprises a first, inner, hollow, tube 12 comprising a PTFE material or liner. The internal hollow channel 11 within this inner tube 12 therefore provides an internal flowpath for receiving and channeling fluid therethrough. The hose 10 further comprises a sleeve of steel braiding 13 provided around the external surface of the PTFE tube/liner 12. In addition to this, the hose 10 comprises an external layer 14, of silicon or fiberglass that is provided around the external surface of the sleeve of steel braiding 13. This external layer 14 of silicon or fiber glass 14 therefore surrounds both the sleeve of steel braiding 13 as well as the PTFE liner or tube 12 so that the silicon or fiberglass component of the hose 10 provides the external, or outer, surface of the hose 10, as shown in FIG. 1. The hose 10 may further comprise, or be attached or connected to a connection or fitting 15, for connecting the hose to another component (not shown).

Figure 2:
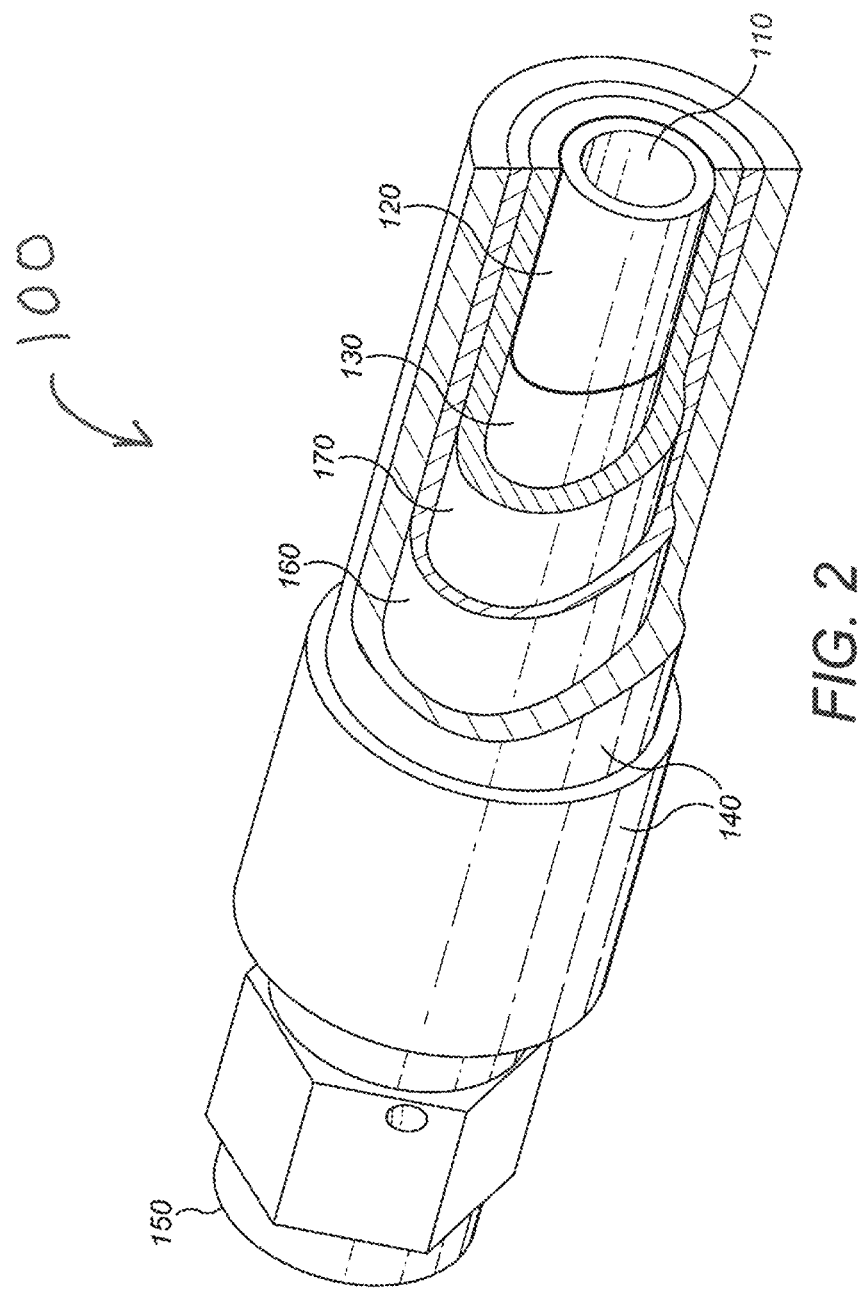
FIG. 2 depicts an example of a new and improved PTFE lines hose 100.

An example of a new and improved flexible PTFE hose 100 that can be used in the aerospace industry for low to medium pressure applications is shown in FIG. 2. This hose 100 may comprise or be attached or connected to a connection or fitting 150 for connecting the hose 100 to another component (not shown).

As can be seen from FIG. 2, this new type of hose 100 is similar to that of FIG. 1 in that it is a multi-layer assembly that also comprises a PTFE-lined, steel-braided hose. That is, it comprises a first, inner, hollow, tube 120 made from a PTFE material or liner, the internal hollow channel 110 within this inner tube 120 providing an internal flowpath for receiving and channeling fluid there through. The hose 100 also further comprises a sleeve of steel braiding 130 provided externally to the PTFE liner/tube 120. In the example shown in FIG. 2 this steel braiding sleeve 130 is provided around and in contact with the external surface of the PTFE tube 120 itself, however, the examples are not limited to this and there may be other layers/sleeves provided there between.

In comparison to the known type of hose shown in FIG. 1, however, this new and improved hose 100 further comprises a layer of an intumescent material (e.g. a coating of intumescent paint) 160 that is provided, (and in some examples, sandwiched) so as to be positioned between the sleeve of steel braiding 130 and the external layer 140 of the hose. In some examples, the coating of intumescent material or paint 160 may be provided so as to be surrounding and in contact with the outer surface of the steel braiding sleeve 130 and also surrounded by and in contact with the inner surface of the external layer 140, of silicon or fiberglass. The examples are not limited to this, however, and in some examples, such as that shown in FIG. 2 an optional additional internal silicon liner sleeve 170 may also be provided between the steel braiding sleeve 130 and the intumescent coating 160. The use of this optional silicon liner sleeve 170 may help to prevent the ingress of the intumescent coating 160 into the braiding sleeve layer 130, whilst also providing an additional level of protection.

Due to the provision of this coating of intumescent material 160 between at least the braided steel sleeve 130 and the external layer 140, the hose 100 is therefore able to meet the fire test requirement for certification without having to increase the thickness of the silicon or glass fiber layer 140.

The use of intumescent material or paint has previously always been discounted from use in flexible assemblies, due to the fact that the shielding layer of hard polymer that is traditionally applied to the external surface is prone to chipping or cracking when impacted or flexed. In the example shown in FIG. 2, however, the underlying layer 160 of intumescent coating is flexible and if suitably protected by the use of thin silicon, glass fiber layer 140 (or indeed another suitable alternative external coating) would remain serviceable until such a point as required.

The new and improved multi-layer hoses 100 described herein and shown with reference to FIG. 2 achieve advantages over known pipe assemblies such as that shown in FIG. 1. For example, in known pipe assemblies such as that shown in FIG. 1, the external fire layer 14 made from silicon or glass fiber may need to be as thick as 10 mm to meet zero flow requirements. In contrast to this, the example shown in FIG. 2 would only require an intumescent paint coating 160 in the order of 1 mm. Overall the weight of the fire protection may also therefore be reduced by approximately 30%.

The use of this coating 160 also removes the need for multiple sleeves of steel braiding 130 to be provided so as to prevent the extrusion of the PTFE tube in high temperature fire situations, as the intumescent paint 160 expands thereby providing an insulating blanket to the assembly.

The new types of flexible pipe assemblies 100 described herein are particularly suitable for use in flammable or critical systems such as oil, fuel or fluid lines within an aircraft. The layer or coating of intumescent material 160 that is provided in the hose 100 may comprise an individual layer that is physically distinct and not chemically combined or integrated with the other sleeves/layers/tubes 120, 130, 140, 170 of the hose 100. The other layers, tubes or sleeves 120, 130, 140, 170 of the hose 100 act to mechanically protect the intumescent coating 160.

The invention claimed is:

1. A multi-layer flexible hose comprising:
   an inner, hollow tube comprising PTFE and
   an outer layer,
   said PTFE tube being provided so as to extend longitudinally within said outer layer;
   a sleeve comprising steel braiding being positioned between said inner PTFE tube and said outer layer; said hose further comprising:
   a coating of intumescent material provided between said steel braiding sleeve and said outer layer;
   wherein said outer layer comprises a compound comprising silicon or fiber glass.

2. The multi-layer flexible hose of claim 1, further comprising
   a silicon sleeve provided between said steel braiding sleeve and said coating of intumescent material.

3. The multi-layer flexible hose of claim 2, wherein an outer surface of said outer layer provides the external surface of the hose.

4. The multi-layer flexible hose of claim 2, wherein said outer layer comprises fiber glass.

5. The multi-layer flexible hose of claim 1, wherein an outer surface of said outer layer provides the external surface of the hose.

6. The multi-layer flexible hose of claim 1, wherein said outer layer comprises silicon or fiber glass.

7. A method of making a multi-layer flexible hose comprising:
   providing an inner, hollow tube comprising PTFE and
   providing an outer layer, said PTFE tube being provided so as to extend longitudinally within said outer layer, wherein said outer layer comprises a compound comprising silicon;
   providing a sleeve comprising steel braiding between said inner PTFE tube and said outer layer; said method further comprising:
   providing a coating of intumescent material between said steel braiding sleeve and said outer layer.

8. The method of claim 7, further comprising
   providing a silicon sleeve between said steel braiding sleeve and said coating of intumescent material.

* * * * *